No. 710,556. Patented Oct. 7, 1902.
G. F. BARTON.
COASTER BRAKE.
(Application filed Aug. 6, 1901.)
(No Model.)

Witnesses: Inventor:
J. B. McGirr. George F. Barton.
W. A. Pauling. by Gifford & Bull.
 Attorneys.

UNITED STATES PATENT OFFICE.

GEORGE F. BARTON, OF ELMIRA, NEW YORK, ASSIGNOR OF ONE-HALF TO FRANK F. WESTON, OF NEW YORK, N. Y.

COASTER-BRAKE.

SPECIFICATION forming part of Letters Patent No. 710,556, dated October 7, 1902.

Application filed August 6, 1901. Serial No. 71,022. (No model.)

*To all whom it may concern:*

Be it known that I, GEORGE F. BARTON, a citizen of the United States, and a resident of Elmira, in the county of Chemung and State of New York, have invented a new and Improved Coaster-Brake, of which the following is a full, clear, and exact specification.

My invention is an improvement in that form of device commonly known as "coaster-brakes" by which the pedals or other driving member and the driving-wheel may be disconnected, so that the bicycle or other vehicle upon which it is placed may coast, and which by the backward movement of the pedals or other driving member will apply a brake to retard the bicycle or other vehicle.

My invention comprises certain novel features, which will be hereinafter described, and particularly pointed out in the claims.

Reference is to be had to the accompanying drawings, forming a part of this specification, in which similar characters of reference indicate corresponding parts in all the figures.

Figure 1:
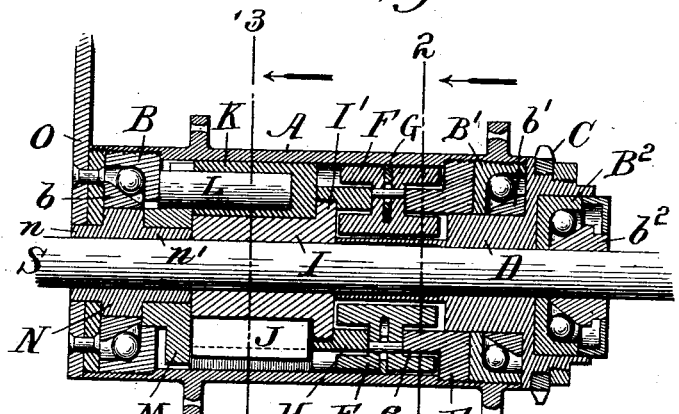
Figures 2, 3:
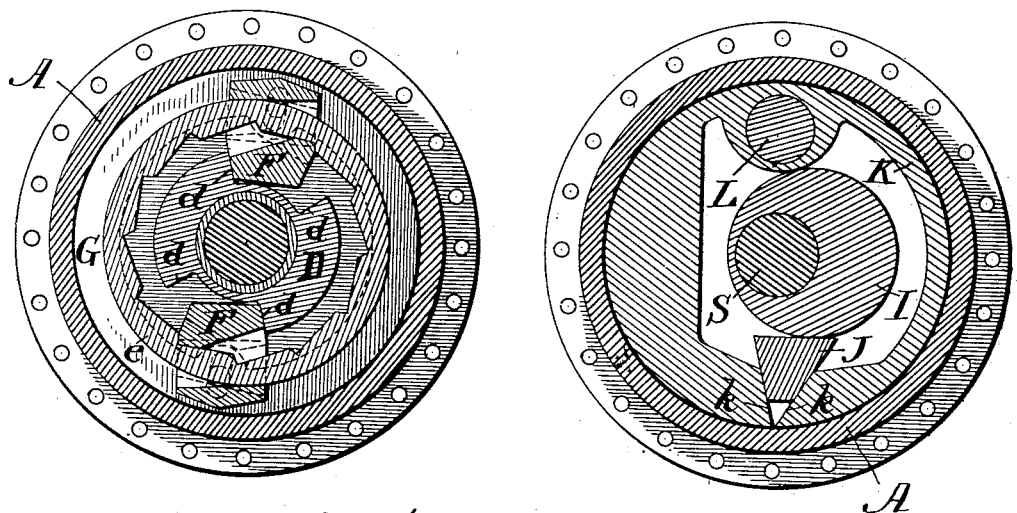

Figure 1 is a longitudinal section through the wheel-hub. Fig. 2 is a cross-section on the line 2 2 of Fig. 1. Fig. 3 is a cross-section on the line 3 3 of Fig. 1, and Figs. 4 and 5 are respectively end and side elevations of one of the clutch-dogs.

The entire operating mechanism of my device except the primary driving member, which is herein shown as a sprocket-wheel, and including the brake, is placed within the wheel-hub and between the bearings thereof. The hub A at one end has a bearing formed by cup B and cone $b$ and at the other end has two bearings formed, respectively, by cup B' and cone $b'$ and by cup B² and cone $b²$. Between these last two bearings is placed a member D, which is mounted to turn upon the shaft S and has the primary driving member or sprocket-wheel C secured thereto outside of the bearings and the end of the hub.

Within the hub and adjacent the cup B' is secured a ring E, which in cross-section is of an angle or L shape, one branch of the L forming a circular flange $e$, which on its inner surface is toothed, as shown in Fig. 2. The inner end of the sleeve D has two longitudinal grooves cut therein having side walls $d$, which are substantially radial, although they might vary from a radial direction without injuriously affecting the action of the parts.

Figures 4, 5:
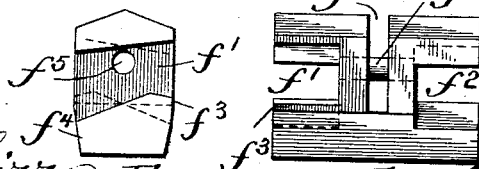

Within the grooves in the sleeve D are two clutch-dogs F, which are shown in detail in Figs. 4 and 5. These have two slots extending one across each end and slightly inclined from a perpendicular plane, the inclination of the slots in opposite ends being in opposite directions from the perpendicular plane. Each of these slots is designed to embrace a ring, one of which consists of the flange $e$, which is secured to the wheel-hub, and the other consisting of the flange H, which is connected with an eccentric or cam I, mounted loosely upon the shaft.

I have herein shown two dogs F, although it is evident that only one may be used or the number may be increased without in any way affecting the invention. The two dogs are placed oppositely and are held in proper relation to each other by means of a spacing-ring G, which is inserted in slots $f$, extending inward from the outer surface of the dogs, the dogs and ring being secured together by pins $g$ entering holes in each. The hole in one of these members, preferably in the ring, should be elongated, so as to allow of radial movement of the dogs. This is clearly shown in Fig. 2.

Upon the shaft, at the outer end of the hub, is placed a thimble N, having ends $n$ and $n'$, which are made square or of any other outline which will prevent relative rotation between said member and another member which fits thereon. Over the outer end $n$ fits an arm O, which is secured to or is a part of the vehicle-frame, so that it cannot turn. Over the other or inner end $n'$ fits a disk M, which has a hole or radial slot adapted to receive the pin L, upon which the split brake-ring K is hung. This brake-ring K has its end surfaces $k$ $k$, where the ring is split, inclined toward each other and adapted to coöperate with similarly-inclined surfaces of a wedge-block J, so that when the wedge-block is forced outward the ring will be expanded and caused to engage the wheel-hub to retard its rotation. The surfaces $k$ $k$ should be inclined toward each other at such an angle that when the pressure is removed from the block the natural spring of the ring K will cause the block to move inward and the brake to free itself.

The brake-block is forced outward by the eccentric I, which is loose on the shaft and has a flange-disk I' at one end, to which the flange-ring H is secured. This ring H is toothed the same as the ring e, but with the teeth facing in the opposite direction. It is turned from the sleeve D by the engagement of one side of the dogs F therewith.

The operation of my device is as follows: When the sprocket-wheel C is turned forwardly, the sleeve D, which is fixedly secured thereto, by its surfaces $d$ engages the dogs F and rocks them, so that they engage the toothed ring $e$. The surfaces $f^4$ on the dog engage the surfaces $d$ on the sleeve and the surfaces $f^3$ on the dog engage the teeth on the ring, thus making a direct and positive connection between ring and sleeve. When the wheel C is turned backward, the dogs are rocked in the opposite direction from a central neutral position and similarly engage the ring H to turn the eccentric and force the wedge-block between the inclined ends of the brake-ring. The spacing-ring G has sufficient contact with the hub so that there is a little friction, tending to carry it along with the hub. As a result, when there is any lagging of the sleeve D relative to the hub the dogs will be shifted into operative position relative to the toothed ring H—that is, into engagement with the brake mechanism. Of course the brake is not applied unless the sleeve D is turned backward relative to the axle and the brake.

Having thus described my invention, what I claim, and desire to secure by Letters Patent, is—

1. In a releasable driving device for wheels, the combination with a hollow wheel-hub a driving member entering the wheel-hub and adapted to be turned about the wheel-axis and a toothed ring secured to the wheel, of a plurality of dogs each having a slot adapted to embrace said ring and a spacing-ring to which said dogs are connected the driving member having relatively projecting parts adapted to engage the dogs to rock them into engagement with the toothed ring.

2. In a releasable driving device for wheels, the combination with a hollow wheel-hub, a driving member entering the wheel-hub and adapted to be turned about the wheel-axis and a toothed ring secured to the wheel, of a plurality of dogs each having a slot adapted to embrace said ring and a spacing-ring and connections between said dogs and the ring adapted to permit bodily radial movement of the dogs, the driving member having relatively projecting parts adapted to engage the dogs to rock them into engagement with the toothed ring.

3. In a coaster-brake the combination with a driving member, a driven member, a brake and a brake-actuating member, said driven member and brake-actuating member having each a circular flange concentric with the same axis, of plural clutch-dogs having notches embracing said flanges and adapted to bite upon one flange when rocked in one direction from a central neutral position, and to bite upon the other flange when rocked in the other direction from said central neutral position, one end of said dogs being engaged with and actuated by the driving member, and a spacing-ring connecting said dogs.

4. In a coaster-brake the combination with a driving member, a driven member, a brake and a brake-actuating member, said driven member and brake-actuating member having each a circular flange concentric with the same axis, of plural clutch-dogs having notches embracing said flanges and adapted to bite upon one flange when rocked in one direction from a central neutral position, and to bite upon the other flange when rocked in the other direction from said central neutral position, one end of said dogs being engaged with and actuated by the driving member, and a spacing-ring connecting said dogs, said dogs having each a slot receiving the spacing-ring, and pivots loosely connecting spacing-ring and dogs.

5. In a coaster-brake the combination with the wheel-hub, the axle, a brake adapted to engage the wheel-hub and axle, and a driving member journaled to turn relative to both the wheel-hub and the axle, of a brake-actuating member having a circular flange concentric with the axle, a similar flange secured to the wheel-hub, plural clutch-dogs having notches embracing said flanges and adapted to bite thereon to turn the flanges in opposite directions when rocked in the respective direction from a central neutral position, one end of each dog being engaged with and rocked by the driving member, said dogs also having slots for the reception of a spacing-ring, a spacing-ring in said slots and means connecting said dogs and ring whereby the dogs may have a slight radial movement relative to the ring.

6. In a coaster-brake, the combination with the wheel-hub, the axle, an expanding band-brake having a fixed support and adapted to engage the wheel-hub, and a driving member journaled to turn relative to both the wheel-hub and the axle, of a brake member having a circular flange concentric with the axle, a similar flange secured to the wheel-hub, plural clutch-dogs having notches embracing said flanges and adapted to bite thereon to turn the flanges in opposite directions when rocked in the respective direction from a central neutral position and also having notches for the reception of a spacing-ring, a spacing-ring in said slots and pivots connecting the spacing-ring and dogs to permit a slight radial movement of the dogs, one end of each dog being engaged with and rocked by the driving-gear.

7. In a hub-brake the combination with the wheel-hub, a split ring within and adapted to be expanded to engage the hub, a fixed support for said ring of a wedge-block between the ends of said ring, an eccentric or cam adapted to turn about the hub-axis, and means by which said cam may be turned.

8. In a hub-brake the combination with the wheel-hub, a split ring within and adapted to be expanded to engage the hub, a fixed support for said ring, and a wedge-block between the ends of the ring, of a rotatable driving member adapted to be reversed in rotation, a cam member and means for turning it to force the wedge-block between the ends of the brake-ring by reversing the driving member.

9. In a coaster-brake the combination with a driving member, a hub member, a brake and a brake-setting member, of double dogs actuated from the driving member and adapted in different positions to be connected both with the hub member and the brake-setting member, and a dog-supporting member having frictional engagement with a member turning with the hub acting to carry the dogs into engagement with the brake-setting member.

10. In a coaster-brake the combination with a driving member a driven member connected with the wheel, a brake, a brake coöperating friction member connected with the wheel, and a brake-setting member, of dogs adapted in different positions to connect the driving member with the driven member and with the brake-setting member, and a member connecting said dogs and having frictional connection with a rotating part of the wheel and thereby actuated to engage the dogs with the brake-setting member.

11. In a coaster-brake the combination with a wheel-hub, an expandible brake-band within and adapted to have frictional engagement with the hub, and a fixed support for the central portion of said band, of a wedge-block between the ends of the brake-band, a driving member adapted to be turned backward, a member adapted to be oscillated upon the hub-axis and engaging the wedge-block to force it between the ends of the brake-band, said member having a circular flange, a radial clutch-dog having teeth adapted to bite upon said flange to turn its member backward, and connections from one end of said dog to the driving member.

In testimony whereof I have hereunto affixed my signature, in the presence of two witnesses, this 1st day of August, 1901.

GEORGE F. BARTON.

Witnesses:
N. A. BEMIS,
F. B. WEAVER.